Patented Oct. 12, 1926.

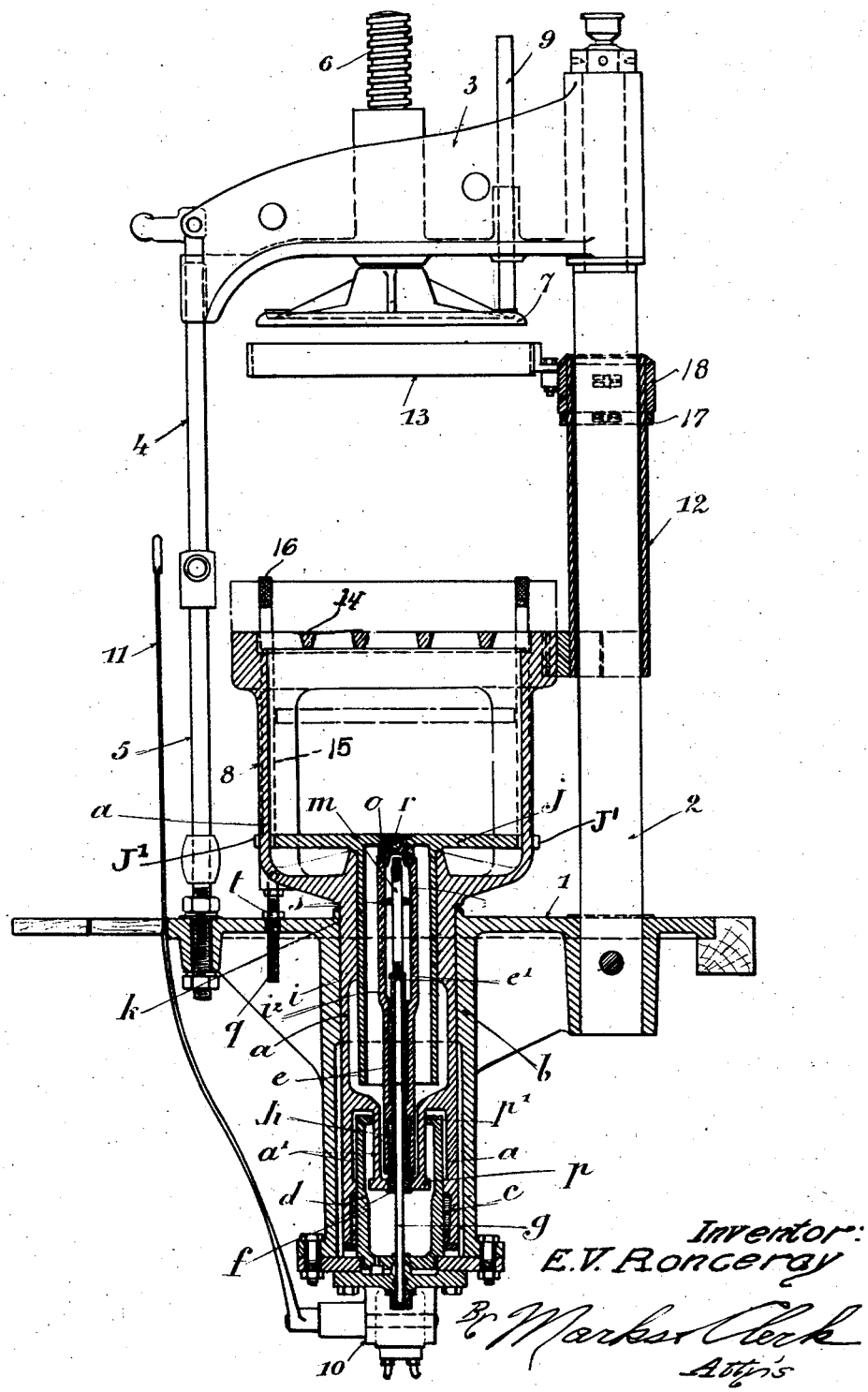

1,602,857

UNITED STATES PATENT OFFICE.

EUGÈNE VICTOR RONCERAY, OF CHOISY LE ROI, FRANCE.

HYDRAULIC MOLDING MACHINE.

Application filed September 6, 1922, Serial No. 586,544, and in France September 6, 1921.

This invention relates to an improved hydraulic molding machine for foundry molds in which all the hydraulic controlling members are arranged in the lower part of the machine whereby the construction is simplified and the operation is improved.

In hydraulic molding machines as hitherto suggested the movable table is carried by an inverted cylinder guided through the base and sliding upon a hollow piston in which the water under pressure is admitted, the parts in sliding contact being protected from the sand by an outer cylinder fitted on the base.

The present invention consists in the provision in a hydraulic foundry machine having an inverted cylinder integral with the table of the machine and guided through the base and upon a hollow piston fixed on said base, of an unmolding plate forced upwardly by a single central unmolding cylinder which slides upon a central hollow unmolding piston secured to the inverted cylinder, the water being supplied to the unmolding cylinder by an axial tube which engages upwardly into said piston and by openings provided in the upper part of the piston.

The accompanying drawing shows by way of example, partly in elevation and partly in longitudinal section a molding apparatus constructed in accordance with the invention.

As shown in the drawing, the machine comprises a cast iron frame or base 1 provided on its lower face with a central barrel or cylindrical portion $b$ in which an inverted cylinder $a$ is adapted to slide vertically, said cylinder carrying the table 8. A solid steel pillar 2 secured to the base 1 supports the press-head 3 which may be swung laterally. In operation the press-head is connected to the base 1 by a hook 4 and the supports 5. A strong screw 6 extending centrally through a screw threaded hole in the press-head, carries the plate 7. By rotating said plate, the space available above the table 8 may be adjusted as desired. The plate 7 is then secured in position by a bar 9 which slides through the press-head. Pressing plates of various shapes may be bolted to the plate 7. At the lower end of the barrel $b$ is mounted the water distributor 10 which is controlled by means of the hand lever 11. This lever may assume three positions, an inoperative or mean position, a molding position and an unmolding position.

The table 8 integral with the cylinder $a$ carries removable bars 14, as in machines of usual construction. The patterns or molding plates are placed on the said bars 14 and carried by the latter. Said table is also provided with a lateral tubular projection 12 which slides along the pillar 2 and carries the rotary false flask 13 supported by means of a collar 17 adjustable in height in said tube 12 and a rotary collar 18 bearing upon said collar 17. The cylinder $a$ fits at its lower end upon a stationary piston $d$ mounted in the barrel $b$. A packing $c$ affords a tight joint between the two members $a$ and $d$. By means of said arrangement all the parts in sliding contact are efficiently protected from the sand.

The upward stroke of the table 8 and cylinder $a$ is limited by means of stop shoulders $p$ provided on an inner extension $a^1$ of said cylinder and adapted to engage corresponding stop members $p^1$ provided on the fixed piston $d$. Said members $p$, $p^1$, are arranged after the manner of a bayonet joint to permit the mounting.

The downward stroke of the table 8 is limited by means of a vertical screw $q$ secured under said table and extending through an aperture in the base 1. Said screw $q$ carries an adjustable stop nut $t$ which may engage the base of the machine.

The unmolding operation is effected by means of a single central piston $e$ of tubular form which is secured at its lower end, as shown at $f$ to the inner extension $a^1$ of the cylinder $a$ and is provided near its upper end with lateral openings $e^1$. Slidably mounted on said hollow piston is a cylinder $i$ provided at its lower end with a packing $h$ and closed at its upper end by a stopper $o$ having in its upper face a square recess $r$. The cylinder $i$ is adapted to force the unmolding plate $j$ in the upward direction through the medium of the stopper $o$. The unmolding plate is vertically guided in the upper part of the cylinder $a$ by a cylindrical depending portion $k$ and is provided with arms $j^1$ extending through vertical slots made in the table 8 said arms carrying the unmolding rods 15. These rods 15 will support the flasks containing the sand and their length is made adjustable by means of screwed milled heads 16. Water under pressure coming from the distributor is supplied into the cylinder $i$ by a central pipe $g$ which fits inside the piston $e$.

The upward stroke of the unmolding plate $j$ is limited by means of an adjustable nut $s$ screwed upon a vertical screw threaded rod $m$ which extends upwardly from the hollow piston $e$. The nut $s$ is provided in its periphery with two diametrically opposed slots or notches and the cylinder $i$ is provided with two vertical inner ribs $i^1$ which extend into said notches so as to prevent the nut from rotating. When the cylinder $i$ rises, its inner shoulder $i^2$ comes finally into contact with the nut $s$ and the cylinder is thereby stopped. For adjusting the upward stroke of said cylinder $i$, the cylinder $i$ itself is rotated by means of a wrench inserted into the recess $r$ whereby the nut $s$ is carried round by the ribs $i^1$ and displaced vertically along the screw $m$.

The manner of operating the machine is as follows:—

The plate 7, the screw-nut $t$ and the screw-nut $s$ are first adjusted in the manner indicated above.

The pattern plate is placed on the bars 14 carried by the molding table 8. The flasks are disposed above each other upon the adjustable heads 16 of the unmolding rods 15. Then, the false flask 13 having been adjusted at a suitable height by means of the collar 17, is placed above said flasks and sand is poured into the latter until said sand comes on a level with the upper edge of the false flask 13. To perform the molding operation the lever 11 is actuated into its molding position in order to connect the inner part of the piston $d$ with the water pipe line. The cylinder $a$ is pressed upwardly until the members $p$ carried by the cylinder strike the members $p^1$ carried by the fixed piston.

Obviously the plate 7 has been adjusted at such a height that the pressure exerted on the sand when said plate penetrates into the false flask 13 will be sufficient for the molding operation.

To perform the unmolding operation the lever 11 is actuated in order to bring it into the discharge or mean position thus causing the lowering of the cylinders $a$ and the table 8. The unmolding operation is effected by putting the distributor in such a position that the water pipe line is connected with the pipe $g$. The water under pressure is admitted into the cylinder $i$ through the apertures $e^1$ which causes the cylinder together with the unmolding plate $j$ to rise.

The table 8 on which the pattern plate is fixed, itself remains stationary and the plate $j$ will thus effect the unmolding operation by raising the rods 15 which hold the flasks containing the compressed sand. Said flasks together with the sand will then be removed and the machine will be ready for the next operation.

When the unmolding operation is effected the distributor 10 is brought again to its discharge position and the plate $j$ moves down to the inoperative position.

Various changes may of course be made in the constructional details shown or described without departing from the invention.

Having now described my invention, what I claim as new and desire to secure by Letters Patent is:

1. A hydraulic molding machine comprising in combination: a frame having a central cylindrical barrel, a press-head carried by said frame, a table, an inverted hydraulic cylinder integral with said table and guided in said barrel, a stationary piston secured to the barrel and extending into the cylinder and means for supplying water under pressure into the space between the cylinder and the piston.

2. A hydraulic molding machine comprising in combination: a frame having a central cylindrical barrel, a press-head carried by said frame, a table, an inverted hydraulic cylinder integral with said table and guided in said barrel, a stationary piston secured to the barrel and extending into the cylinder means for supplying water under pressure into the space between the cylinder and the piston and means for limiting the stroke of the table at both ends of said stroke.

3. A hydraulic molding machine comprising in combination: a frame having a central cylindrical barrel, a press-head carried by said frame, a table, an inverted hydraulic cylinder integral with said table and guided in said barrel, a stationary piston secured to the barrel and extending into the cylinder, means for supplying water under pressure into the space between the cylinder and the piston, stop members provided on an inner extension of the cylinder and cooperating stop members on the piston.

4. A hydraulic molding machine comprising in combination: a frame having a central cylindrical barrel, a press-head carried by said frame, an inverted hydraulic cylinder integral with said table and guided in said barrel, a stationary piston secured to the barrel and extending into the cylinder, means for supplying water under pressure into the space between the cylinder and the piston, stop members provided on an inner extension of the cylinder, cooperating stop members on the piston, a screw-threaded rod secured to the table and adapted to extend through an aperture in the frame and a stop nut screwed on said rod and adapted to engage with the frame.

5. A hydraulic molding machine comprising in combination: a frame having a central cylindrical barrel, a press-head carried by said frame, a table, an inverted hydraulic cylinder integral with said table and guided in said barrel, a stationary piston secured to the barrel and extending into the cylinder, means for supplying water under pressure into the space between the cylinder and the piston, means for limiting the stroke of the table at both ends of said stroke, an unmolding plate, means for guiding said unmolding plate in said cylinder, an unmolding cylinder adapted to force said unmolding plate upwardly, a central hollow piston engaging upwardly into the unmolding cylinder and means for supplying water under pressure into said unmolding cylinder through the hollow piston.

6. A hydraulic molding machine comprising in combination: a frame having a central cylindrical barrel, a press-head carried by said frame, a table, an inverted hydraulic cylinder integral with said table and guided in said barrel, a stationary piston secured to the barrel and extending into the cylinder, means for supplying water under pressure into the space between the cylinder and the piston, means for limiting the stroke of the table at both ends of said stroke, an unmolding plate, means for guiding said unmolding plate in said cylinder, an unmolding cylinder adapted to force said unmolding plate upwardly, a central hollow piston engaging upwardly into the unmolding cylinder, means for supplying water under pressure into said unmolding cylinder through the said hollow piston and means for limiting the stroke of the unmolding cylinder at both ends of said stroke.

7. A hydraulic molding machine comprising in combination: a frame having a central cylindrical barrel, a press-head carried by said frame, a table, an inverted hydraulic cylinder integral with said table and guided in said barrel, a stationary piston secured to the barrel and extending into the cylinder, means for supplying water under pressure into the space between the cylinder and the piston, means for limiting the stroke of the table at both ends of said stroke, an unmolding plate, means for guiding said unmolding plate in said cylinder, an unmolding cylinder adapted to force said stripping plate upwardly, a central hollow piston engaging upwardly into the unmolding cylinder, means for supplying water under pressure into said unmolding cylinder through the said hollow piston, a screw-threaded rod extending upwardly from said piston, a stop nut on said screw threaded rod adapted to engage with the unmolding cylinder in the upward stroke of the latter, means to prevent the nut from rotating with respect to the unmolding cylinder and means for rotating the unmolding cylinder through the stripping plate.

In testimony whereof I have signed my name to this specification.

EUGÈNE VICTOR RONCERAY.